(12) United States Patent
Stanley et al.

(10) Patent No.: US 11,671,801 B2
(45) Date of Patent: *Jun. 6, 2023

(54) MEDIA ECHOING AND SOCIAL NETWORKING DEVICE AND METHOD

(71) Applicants: Michael Stanley, Prosper, TX (US); Jeffrey David, Irvine, CA (US)

(72) Inventors: Michael Paul Stanley, Prosper, TX (US); Jeffrey Michael David, Irvine, CA (US)

(73) Assignee: Ascension Intellectual Properties LLC, Prosper, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/479,064

(22) Filed: Sep. 20, 2021

(65) Prior Publication Data

US 2022/0007157 A1  Jan. 6, 2022

Related U.S. Application Data

(63) Continuation of application No. 16/914,434, filed on Jun. 28, 2020, now Pat. No. 11,128,996, which is a continuation of application No. 16/402,435, filed on May 3, 2019, now Pat. No. 10,701,530, which is a continuation of application No. 15/728,228, filed on Oct. 9, 2017, now Pat. No. 10,292,022, which is a continuation-in-part of application No. 15/355,265, filed on Nov. 18, 2016, now Pat. No. 9,788,180, which is a continuation of application No.
(Continued)

(51) Int. Cl.
*H04W 4/21* (2018.01)
*H04W 4/02* (2018.01)
*G06Q 50/00* (2012.01)
*G06Q 10/10* (2023.01)
*G06Q 30/0251* (2023.01)
*H04W 4/021* (2018.01)

(52) U.S. Cl.
CPC .............. *H04W 4/21* (2018.02); *G06Q 10/10* (2013.01); *G06Q 30/0261* (2013.01); *G06Q 50/01* (2013.01); *H04W 4/021* (2013.01); *H04W 4/023* (2013.01)

(58) Field of Classification Search
CPC ....... H04W 4/21; H04W 4/021; H04W 4/023; G06Q 10/10; G06Q 30/0261; G06Q 50/01
See application file for complete search history.

(56) References Cited

U.S. PATENT DOCUMENTS 9,501,760 B2 * 11/2016 Stanley .................. G06Q 10/10
9,788,180 B2 * 10/2017 Stanley .................. H04W 4/21
10,292,022 B2 * 5/2019 Stanley .................. H04W 4/21
(Continued)

*Primary Examiner* — John M Macilwinen

(57) ABSTRACT

A method and apparatus for echoing media via a mobile device are disclosed herein. According to an embodiment, the method can include displaying automatically to a user, on the mobile device, a list of one or more respective identifiers of one or more other users experiencing respective media within a selectable geographic area. The user is then allowed to select whether to play one or more of the respective media on the mobile device, and can connect with the one or more other users via a social networking site. As a result, the user can network with previously unknown people, based on a common taste in music or other media, for example, as well as a geographic location.

20 Claims, 4 Drawing Sheets

Related U.S. Application Data

13/454,546, filed on Apr. 24, 2012, now Pat. No. 9,501,760.

(56) References Cited

U.S. PATENT DOCUMENTS

| | | | |
|---|---|---|---|
| 10,701,530 B2* | 6/2020 | Stanley | G06Q 30/0261 |
| 11,128,996 B2* | 9/2021 | Stanley | G06Q 10/10 |
| 2005/0021624 A1* | 1/2005 | Herf | H04L 12/1822 |
| | | | 709/204 |
| 2006/0002681 A1* | 1/2006 | Spilo | H04N 21/4305 |
| | | | 386/220 |
| 2009/0106357 A1* | 4/2009 | Igelman | H04L 69/28 |
| | | | 709/203 |

* cited by examiner

MEDIA ECHOING AND SOCIAL NETWORKING DEVICE AND METHOD

CROSS REFERENCE TO RELATED APPLICATIONS

This application claims the priority of, and is a continuation of U.S. patent application Ser. No. 16/914,434 (U.S. Pub 2020-0344580 A1) filed Jun. 28, 2020, which is a continuation of U.S. patent application Ser. No. 16/402,435 (U.S. Pub 2019-0261143 A1) filed May 3, 2019, which is a continuation of U.S. patent application Ser. No. 15,728,228 (U.S. Pub 2018/0035270 A1 issued as U.S. Pat. No. 10,292,022) filed Oct. 9, 2017, which is a continuation-in-part of U.S. patent application Ser. No. 15/355,265 (U.S. Pub. 2017/0070872 issued as U.S. Pat. No. 9,788,180), filed Nov. 18, 2016, and Ser. No. 13/454,546 (U.S. Pub. 2013/0282809 issued as U.S. Pat. No. 9,501,760), filed Apr. 24, 2012, the contents of all of which are incorporated herein by reference in their entirety.

FIELD OF THE INVENTION

This relates generally to media echoing and social networking methods and devices, for use with mobile systems.

BACKGROUND OF THE INVENTION

Existing media providers, such as Pandora®, Google Play and Spotify, Ltd., allow listeners to wirelessly stream music on mobile devices. In the case of Spotify, Ltd., for example, a user can choose to display his or her music selections on social networking websites, such as Facebook®, and can instantly share music with his or her Facebook "friends" who also subscribe to the media provider.

However, the existing media providers fail to support a mechanism for allowing a user to share, or echo, music, or otherwise connect to other users, who are not currently "friends" via social networking. That is, the existing technology lacks the ability to allow users to establish social interactions with strangers within a predetermined, selectable geographic area, based on a shared interest in chosen media.

Therefore, there exists a need for methods and systems capable of allowing a user to designate a geographic area within which a list of identifiers of other users playing media can be displayed on a user's device, such that the user can select to play (e.g., stream), the same media as one or more of the listed other users. Accordingly, the user can network with previously unknown people, based on a common taste in music, for example.

SUMMARY OF THE INVENTION

The presently disclosed embodiments are directed to solving one or more of the problems presented in the prior art, described above, as well as providing additional features that will become readily apparent by reference to the following detailed description when taken in conjunction with the accompanying drawings.

One embodiment is directed to a method of echoing media via a mobile device. The method can include displaying automatically to a user, on the mobile device, a list of one or more respective identifiers of one or more other users experiencing respective media within a selectable geographic area; and allowing the user to select whether to play one or more of the respective media on the mobile device.

Another embodiment is directed to an apparatus for echoing media. The apparatus includes a display configured to display automatically to a user, on a mobile device, a list of one or more respective identifiers of one or more other users experiencing respective media within a geographic area defined by the user; and a section unit configured to allow the user to select whether to play one or more of the respective media on the mobile device.

Yet another embodiment is directed to a system configured to echo media on a mobile device. The system includes a positioning unit configured to determine respective distances of a plurality of mobile device, with respect to a first mobile device; a processor configured to compare the distances between each of the plurality of mobile devices and the first mobile device to a preselected distance selected by a first user of the first mobile device; and transmitter configured to transmit, to the first mobile device, a list of one or more other of the plurality of mobile devices, automatically when any one of the one or more other of the plurality of mobile devices moves within the preselected distance form the first mobile device used by the first user. According to certain embodiments, the list includes personalized and reconfigurable identifiers, respectively, of each user of the one or more other of the plurality of mobile devices that moves within the preselected distance, and the list includes respective media currently being streamed from a centralized server by each user of the one or more other of the plurality of mobile devices that moves within the preselected distance. The system further includes a display unit configured to display automatically, to the first user, the list such that the first user selects whether to stream one or more of the respective media from the centralized server; and a transmitter configured to transmit an indication to the centralized server indicating that the first user has selected to stream one or more of the respective media. According to certain embodiments, the centralized server is further configured to indicate to at least one of the one or more other of the plurality of mobile devices that the first user has selected to stream one or more of the respective media. The indication from the centralized server can include a personalized identifier designated by the first user.

It is to be understood that both the foregoing general description and the following detailed description are exemplary and are intended to provide further explanation of the claimed subject matter.

BRIEF DESCRIPTION OF THE DRAWINGS

The present disclosure, in accordance with one or more various embodiments, is described in detail with reference to the following Figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION OF THE PREFERRED EMBODIMENTS

In the following description of embodiments, reference is made to the accompanying drawings which form a part hereof, and in which it is shown by way of illustration specific embodiments in which the invention can be practiced. It is to be understood that other embodiments can be used and structural changes can be made without departing from the scope of the disclosed embodiments.

Figure 1:
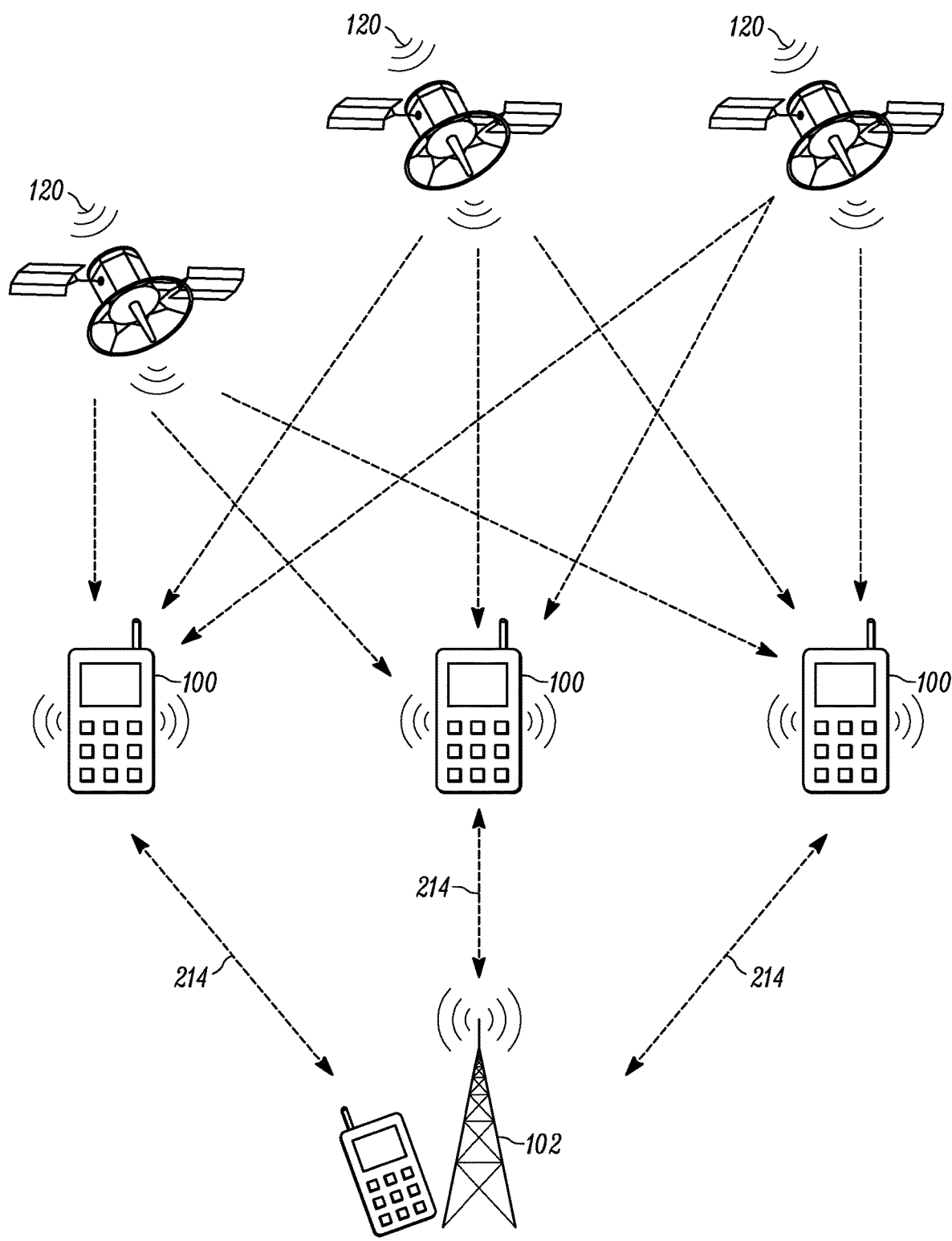
FIG. 1 illustrates an exemplary operating environment including wireless mobile devices, according to various embodiments of the present disclosure.

FIG. 1 illustrates a mobile radio channel operating environment, according to one embodiment of the present invention. The mobile radio channel operating environment may include a base station (BS) 102, one or more mobile stations (also referred to as MS, mobile device, or the like) 100, and global positioning system (GPS) satellites 120. As described in further detail below, the respective locations of the mobile devices 100 can be determined based on GPS satellites 120 or other known mechanisms and systems for detecting relative proximities of mobile devices 100, performed by hardware and software within mobile devices 100 themselves.

The exemplary mobile station 100 in FIG. 1 is a mobile phone; however, alternately, mobile station 100 may be an automobile, MP3 player or other similar portable device. According to some embodiments, mobile station 100 may be a personal wireless computer such as a wireless notebook computer, a wireless palmtop computer, tablet, or other mobile computer devices. Similarly, a mobile station 100 can include virtual reality (VR)-style goggles or glasses, which may or may not be configured to incorporate a separate wireless device. For example, the VR goggles could use the screen and/or the GPS functionality of the separate wireless device in order to be worn by a user and display a VR-type presentation to the user. Of course, various configurations may be implemented within the scope of the present disclosure.

The base station 102 can be a centralized server unit having a memory module, processor module and transceiver module, configured to store and distribute media to mobile stations 100. According to an embodiment, base station 102 can be another mobile device 100, as would be understood by one of ordinary skill in the art. Mobile stations 100 can include any conventional GPS receiver modules, which are not depicted.

Figure 2:
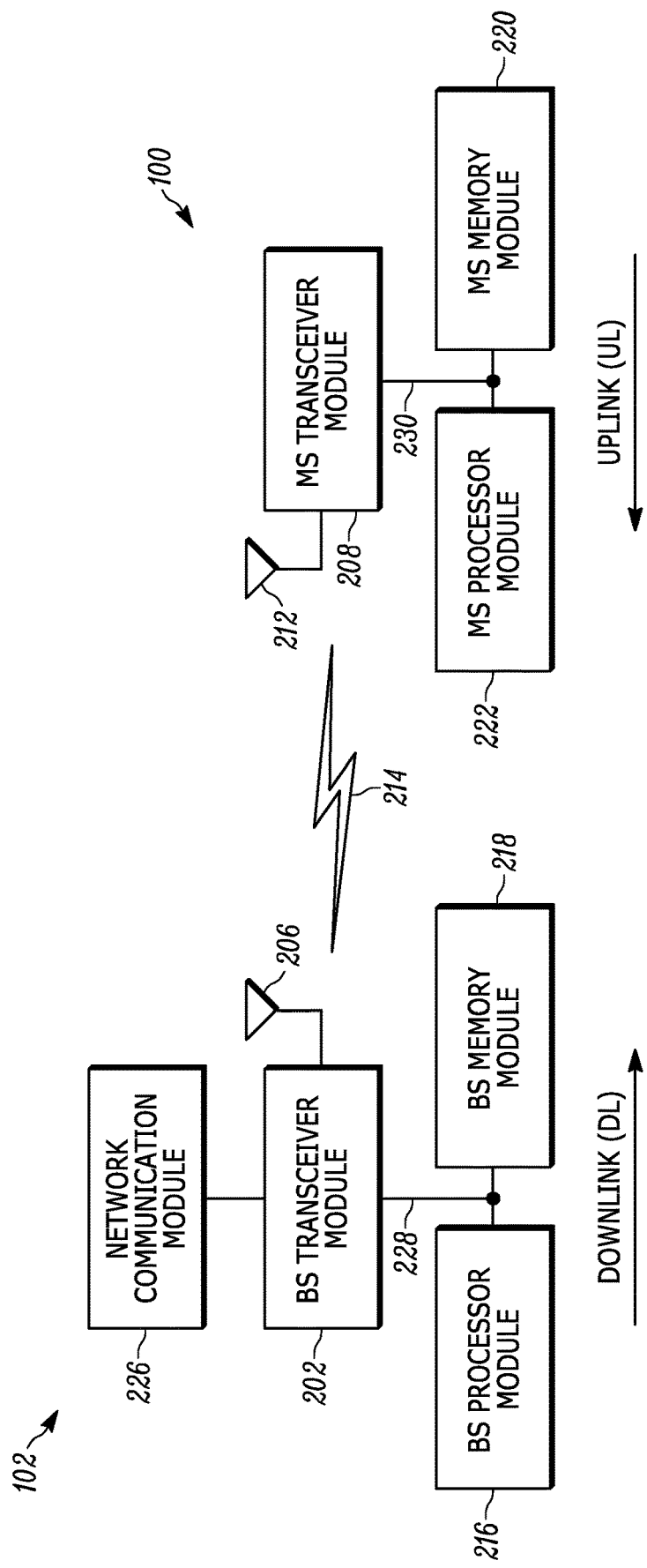
FIG. 2 illustrates an exemplary communication system including a mobile device and a base station, according to various embodiments of the present disclosure.

FIG. 2 shows an exemplary wireless communication system for transmitting and receiving data between mobile station 100 and base station 102, in accordance with one embodiment of the present invention. The mechanism may include components and elements configured to support known or conventional operating features that need not be described in detail herein. This system generally comprises a base station 102 with a base station transceiver module 202, a base station antenna 206, a base station processor module 216 and a base station memory module 218. System 200 generally comprises a mobile station 100 with a mobile station transceiver module 208, a mobile station antenna 212, a mobile station memory module 220, a mobile station processor module 222, and a network communication module 226. Of course both BS 102 and MS 100 may include additional or alternative hardware and software modules without departing from the scope of the present disclosure, as would be apparent to one of ordinary skill in the art.

Furthermore, these and other elements of the system may be interconnected together using a data communication bus (e.g., 228, 230), or any suitable interconnection arrangement. Such interconnection facilitates communication between the various elements of the wireless system. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

In the exemplary system, the base station transceiver 202 and the mobile station transceiver 208 each comprise a transmitter module and a receiver module (not shown). Additionally, although not shown in this figure, those skilled in the art will recognize that a transmitter may transmit to more than one receiver, and that multiple transmitters may transmit to the same receiver.

The mobile station transceiver 208 and the base station transceiver 202 are configured to communicate via a wireless data communication link 214. The mobile station transceiver 208 and the base station transceiver 202 cooperate with a suitably configured RF antenna arrangement 206/212 that can support a particular wireless communication protocol and modulation scheme. In the exemplary embodiment, the mobile station transceiver 208 and the base station transceiver 202 can be configured to support industry standards such as the Third or Fourth Generation Partnership Project Long Term Evolution (3GPP or 4GPP LTE), Time Division-Synchronous Code Division Multiple Access (TD-SCDMA), Wi-Fi, and the like. The mobile station transceiver 208 and the base station transceiver 202 may be configured to support alternate, or additional, wireless data communication protocols, including future variations of IEEE 802.16, such as 802.16e, 802.16m, and so on.

Processor modules 216/222 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. In practical embodiments the processing logic may be resident in the base station and/or may be part of a network architecture that communicates with the base station transceiver 202.

The steps of a method or algorithm described in connection with the embodiments disclosed herein may be embodied directly in hardware, in firmware, in a software module executed by processor modules 216/222, or in any practical combination thereof. A software module may reside in memory modules 218/220, which may be realized as RAM memory, flash memory, ROM memory, EPROM memory, EEPROM memory, registers, a hard disk, a removable disk, a CD-ROM, or any other form of storage medium known in the art. In this regard, memory modules 218/220 may be coupled to the processor modules 218/222 respectively such that the processors modules 216/220 can read information from, and write information to, memory modules 618/620. As an example, processor module 216, and memory modules 218, processor module 222, and memory module 220 may reside in their respective ASICs. The memory modules 218/220 may also be integrated into the processor modules 216/220. In an embodiment, the memory module 218/220 may include a cache memory for storing temporary variables or other intermediate information during execution of instructions to be executed by processor modules 216/222. Memory modules 218/220 may also include non-volatile memory for storing instructions to be executed by the processor modules 216/220.

Memory modules 218/220 may include a frame structure database (not shown) in accordance with an exemplary embodiment of the invention. Frame structure parameter databases may be configured to store, maintain, and provide data as needed to support the functionality of system 200 in the manner described below. Moreover, a frame structure database may be a local database coupled to the processors 216/222, or may be a remote database, for example, a central network database, and the like. A frame structure database may be configured to maintain, without limitation, frame structure parameters as explained below. In this manner, a frame structure database may include a lookup table for purposes of storing frame structure parameters.

The network communication module 226 generally represents the hardware, software, firmware, processing logic, and/or other components of the system that enable bi-directional communication between base station transceiver 202, and network components to which the base station transceiver 202 is connected. For example, network communication module 226 may be configured to support internet or Wi-Fi traffic. In a typical deployment, without limitation, network communication module 226 provides an 802.3 Ethernet interface such that base station transceiver 202 can communicate with a conventional Ethernet based computer network. In this manner, the network communication module 226 may include a physical interface for connection to the computer network (e.g., Mobile Switching Center (MSC)).

Figure 3:
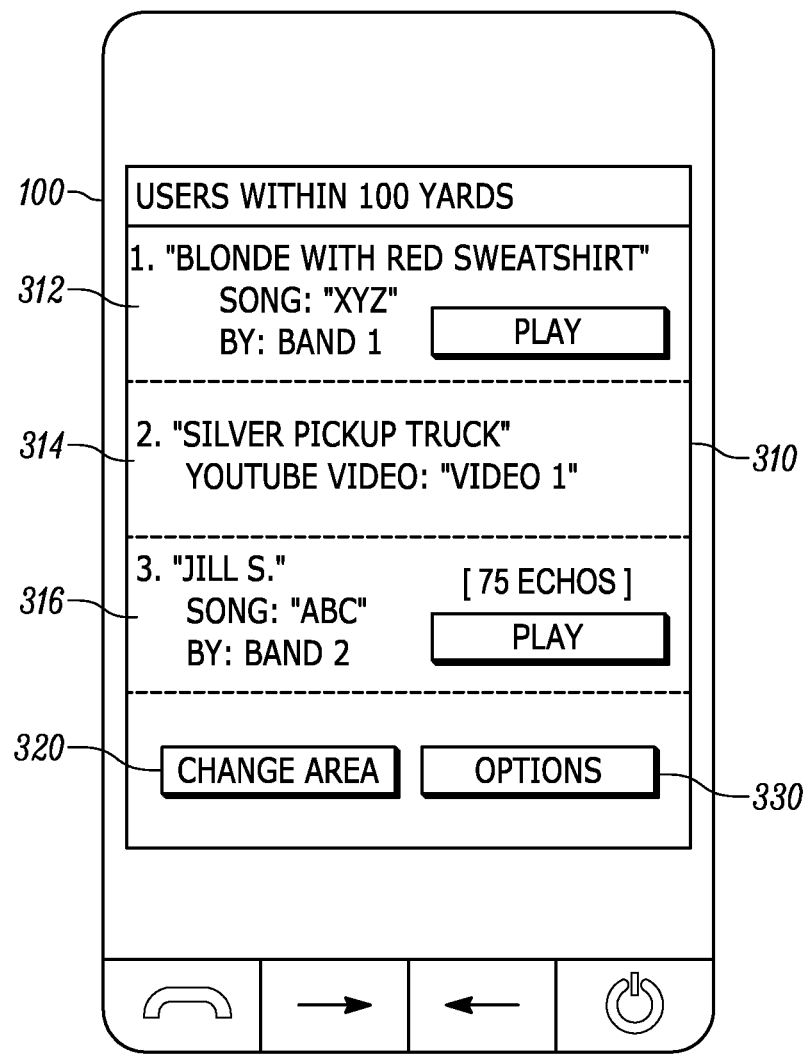
FIG. 3 illustrates an exemplary mobile device displaying various features of the present technology, according to various embodiments of the present disclosure.

FIG. 3 shows an exemplary mobile device 100, according to an embodiment of the present disclosure. For exemplary purposes, the mobile device 100 is depicted as a wireless telephone; however, any mobile device may be incorporated without departing from the scope of the invention. For example, according to an embodiment, the mobile device 100 can be an on-board computing system within an automobile. As shown in FIG. 3, a list is displayed in display area 310, which includes identifiers of three other mobile device 100 users who are currently playing media and are within a preselected geographic area selected by the user of the depicted mobile device 100.

According to certain embodiments, GPS satellites 120 can provide an exact position to each mobile device 100, which in turn transmit their respective positions to a centralized server (e.g., base station 102). The centralized server can also store the preselected geographic area determined by the user (e.g., a radius of 100 yards), and can compare the distances between the depicted mobile device 100 and other mobile devices 100 who are playing media and are logged on to a particular website or application, for example. If any of the other mobile devices 100 are logged on and within the user's defined area, then the centralized server can automatically incorporate the identifiers of the users of those other mobile devices 100 into the list displayed in display area 310 of the depicted mobile device 100. The user of the depicted mobile device 100 can change the desired geographic area within which to locate other users, via the "CHANGE AREA" icon 320, which can allow the user to customize the searchable area.

In this exemplary scenario, three other mobile devices have been determined to be within the bounds set by the user of the depicted mobile device 100 (e.g., "Blond with Red Sweatshirt," 312 "Silver Pickup Truck," 314 and "Jill S." 316). The identifiers are respectively designated by each of the users of the mobile devices 100. Of course, one of ordinary skill in the art would realize that the users could change their respective identifiers at any time (e.g., via their own "OPTIONS" icon 330), depending on what car they are driving, where they are located, what they are wearing, their appearance, a nickname, or any other identifying features they wish to show up on the other users' lists.

According to one embodiment, the list can include an identifier of what type of media is being experienced by the respective other users (e.g., "Jill S." 316 is listening to song "ABC" by Band 2). Alternatively, the other users may experience audio and/or video via YouTube, for example, like "Silver Pickup Truck" 314. The user of the depicted mobile device 100 can select to play (or echo) any of the media that is being experienced by the other users on the list.

According to the depicted example, the user can select a "PLAY" icon, which will transmit a signal to the centralized server to request streaming of the identified media. The streaming can begin from the start of the particular song or video, for example, or can begin at a middle point in the song or video where the identified other user is currently at in real time.

In the depicted example, the number of times other users who are identified on the list have been "echoed" (i.e., the number of times other users have decided to experience the same media that they are currently experiencing) can be provided to the user of the depicted mobile device 100. In this case, "Jill S." 316 is identified as having 75 echoes in real time (i.e., 75 other users have decided to experience what "Jill S." is currently experiencing at that time). Any other experience indication(s) or indicator(s) or identifier(s) (e.g., points and/or levels and/or color codes and/or any other visual or audible indication) could be displayed or played for each user as well. In such a case, each user could have an overall experience total displayed, which may indicate how active the user has been on the application in the past (e.g., not currently in real time, but a total of overall usage or overall media experienced cumulatively). Any experience indication could be altered in real time, based on real-time activity as the media originator or echoing other users. An algorithm stored at a server, for example, could be implemented to determine what experience indication/identifier should be displayed, depending on the amount and type of usage of the application.

According to certain embodiments, predetermined geographic areas can be set at a central server, or obtained and gathered from any number of servers (e.g., selected by any user or any network administrator), such that the predetermined geographic areas can be set to provide various activities or other options to the user of the mobile device

100 when mobile device 100 arrives within the predetermined geographic area. Or, a user can select a geographic area, including a selectable radius from the user's mobile device, for example, so that another user can interact with the user only within the user's selected radius. In such a case, the need for presetting an area or distance at a centralized server is unnecessary. A desired geographic area could be determined by user's being capable of accessing a particular cellular base station for example. In such a case, any mobile device accessing a particular base station could be considered acceptably within the selected geographic area, according to one embodiment. In such an embodiment, processing circuitry, communicatively coupled to memory, would be capable of accessing user data from any particular base station in order to determine which user devices are served thereby.

According to an example, when a mobile device 100 is within a predetermined distance (e.g., set at the central server) from a predetermined geographic location, the user of mobile device 100 may be see a display on mobile device 100 showing an option to purchase or otherwise obtain (e.g., trade) digital media to be streamed or downloaded to mobile device 100. For example, users may be determined to be within a predetermined geographic area (or even at a particular geographic location) if their respective devices are within a predetermined threshold distance (e.g., a 50' radius) from a virtual marker, such as predetermined geographic coordinates, or any other manner of assigning a marker to any particular location. Mobile device 100 may provide a visual or audio indication thereon to indicate where such a predetermined geographic area is (e.g., a station provided on a map, via augmented or virtual reality, or any visual or audible indication). A predetermined geographic locations could be any point of interest or establishment, like a physical store, place of business, home or other landmarks, according to various embodiments, which could be indicated to the user when the user searches geographic areas on the mobile device 100 (e.g., zooming in or out on a map to search for markers or other indications of such a predetermined geographic area, or simply moves into a new geographic area with establishments of points of interests at designated geographic locations). In other words, a geographic area could be an area selectable by any user which could include one or more particular geographic locations of interest.

According to an embodiment, when two or more users are simultaneously at or within a predetermined geographic location or area, as determined by the central server, for example, the two or more users may be allowed and able to transfer and receive digital media from each other. Such a transfer of media could be device-to-device, or via a central server system (including one or more servers and/or processors). Such a transfer of digital media could be performed by any mechanisms, as would be apparent to one of ordinary skill in the art. The digital media could be then stored on each mobile device 100 (or one or the other), or saved on a centralized memory (e.g., cloud storage) for streaming and/or downloading later.

Such digital media to be transferred and/or received can include digital coupons, tradable pictures (e.g., drawings, photos, etc.), videos or any other type of media. According to one embodiment, if a user was determined to be within a participating store, for example, the mobile device 100 of the user could be automatically sent a digital coupon or other advertisement, which could relate to the store's business for example. The digital media could be pre-stored on a centralized server/memory and transmitted to the mobile device 100, or could be stored at a memory at the store and transmitted to mobile device 100 directly (device-to-device) or via a centralized server. Further, the user could be prompted to purchase physical or virtual items upon being determined to be at the geographic location.

It should be appreciated that various revenue streams could be realized using the features described herein. For example, a participating store at a predetermined physical location could pay a fee or subscription in order to have a virtual marker located at its physical location, in order to attract users to their physical location. Various other advertisement revenues could be generated by displaying advertisements dependent upon the determined geographic location of the user of mobile device 100. Moreover, the physical store or any online store could generate revenue by offering add-on purchases (either additional digital media and/or actual items at the store) for sale to the user. Further, various conventional techniques could be used in order to determine which advertisements or other digital content to push to the user, and ultimately displayed on the mobile device, based on various other criteria (e.g., user data or other user preferences), to determine what digital media to push to the user. Revenue could be generated by each other user experiencing media based on a number of echoes their media has generated in real time, if the user is the creator of the media, for example, as in the case where the user experiencing media is the originator of said media via YouTube Live, for example.

Of course, the layout of the features and information presented on the list is merely one example, and is not intended to limit the scope of the disclosure in any way. One of ordinary skill in the art would realize that various additional information and combinations thereof could be depicted in various ways. Moreover, a touchscreen cellular phone is depicted with icons that can execute various functions via the user's touch. However, any display device could be implemented with any type of scroll, highlight and/or selection mechanisms in conventional mobile devices.

Furthermore, it is not necessary for GPS satellites to be utilized in obtaining exact coordinates of each mobile device 100. Using known techniques of detecting the presence of other mobile devices within a defined radius, each mobile device 100 could determine on its own that another mobile device 100 is within an acceptable range. That is, it would not be necessary for the centralized server to make the comparison between the respective distances and the desired area preselected by the user of the mobile device 100. Within certain distances, mobile devices 100 could identify themselves are concurrently running an echoing application or logged on to a particular website, and could transfer identifiers and media information automatically via any conventional technique, such as Blutetooth®, etc. Then, if the user of the mobile device 100 depicted in FIG. 3 decided to select one or more media on the list to play, a signal would be transmitted to the centralized server requesting to stream the particular media.

Figure 4:
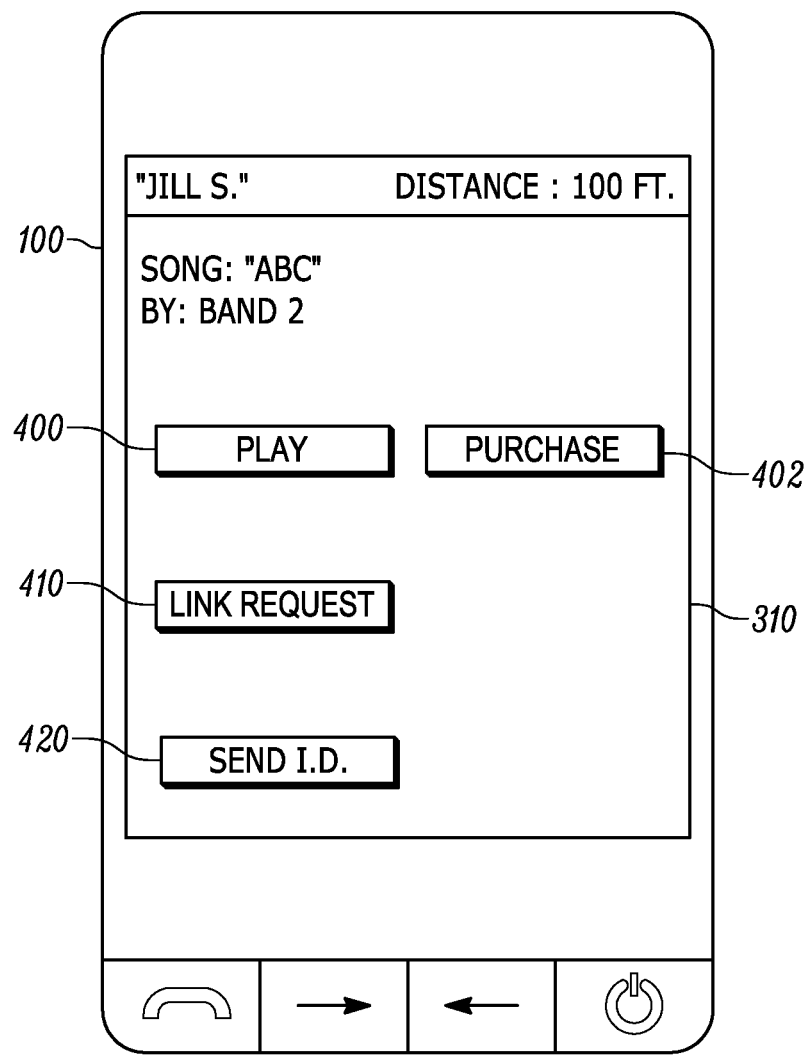
FIG. 4 illustrates an exemplary mobile device displaying various features of the present technology, according to various embodiments of the present disclosure.

FIG. 4 is an exemplary mobile device 100, according to an embodiment of the present disclosure. In the depicted embodiment, display area 310 shows a layout of the screen if the user decides to select identifier "Jill S." 316 for additional options, but does not immediately decide to echo the media by selecting "PLAY." In FIG. 4, display area 310 shows the precise distance that between "Jill S." and the depicted mobile device 100 (e.g., 100 ft.). The exemplary display area provides an option for the user to play the media (i.e., "PLAY" 400) or purchase the song, for example (i.e., "PURCHASE" 402). If the user selects to purchase the media, the mobile device 100 can automatically direct the user to a media distributer, such as iTunes, Amazon, etc.

According to the exemplary embodiment, the user of the depicted mobile device 100 can select "LINK REQUEST" 410, which can send a signal to the centralized server, instructing the centralized server to send a friend request, for example, for connecting via social networking (e.g., a friend request via Facebook for Google+, or any other social networking outlet). Of course, it is possible that the request can be sent directly to the user of the other device (i.e., "Jill S.") directly, if contact information is exchanged beforehand, using any conventional technique.

According to the exemplary embodiment, the user of the depicted mobile device 100 can select "SEND I.D." 420, which can send a signal to the centralized server, instructing the centralized server to send an identification message to the mobile device of one or more of the other users, which was echoed by the depicted mobile device 100. Of course, the user of the depicted mobile device 100 can designate and personalize any identifier of his or her choosing to be displayed to the user of the echoed device. In this manner, the user of the echoed device can become aware that another user has echoed the media being played on his or her device, and can receive an identifier of the user who has echoed the media.

In accordance with the present disclosure, a user may be allowed to designate a geographic area within which a list of identifiers of other users playing media can be displayed on a user's device, such that the user can select to play (e.g., stream), the same media as one or more of the listed other users (a.k.a. echo). Therefore, as one exemplary advantage to embodiments described herein, the user can network with previously unknown people, based on a common taste in music or other media, for example, as well as a geographic location.

While various embodiments of the invention have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

In this document, the terms "computer program product", "computer-readable medium", and the like, may be used generally to refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method, comprising:
 displaying to a user, on a user device, an indication of whether one or more other users are experiencing respective media within a customizable search area;
 displaying automatically to the user at least one indicator corresponding, respectively, to at least one of the one or more other users, wherein the indicator is alterable at least in part after one decides to experience respective media in real time while any of the respective at least one of the one or more other users currently experiences the respective media, wherein
the indicator is displayed concurrently with at least one respective identifier related to the at least one or more other users determined to be within the customizable search area;
allowing the user to select whether to experience one or more of the respective media on the user device; and
causing a processor to transmit a signal to a second user to indicate to the second user that the user of the user device selected to experience the media being experienced by the second user, wherein
when the user selects to experience one or more of the respective media on the user device, the respective media is experienced such that the respective media is experienced concurrently in real time with the respective media experienced by the second user.

2. The method of claim 1, further comprising:
providing an option to request a connection with one or more of the one or more other users via a social networking site.

3. The method of claim 1, wherein the respective media initiated by the second user is previously stored on a server before being initiated.

4. The method of claim 1, further comprising:
displaying one or more advertisements on the user device of the user or the one or more other users.

5. The method of claim 4, wherein the one or more advertisements are related to one or more geographic locations or at least one establishment within a set distance from the one or more geographic locations.

6. The method of claim 1, wherein the user device is able to be incorporated as part of a virtual reality viewing device.

7. The method of claim 1, wherein at least one of an indication of one or more geographic locations or the respective identifiers are provided in order of their distance from the user device.

8. The method of claim 1, further comprising:
allowing the user to purchase a good or service at one or more displayed geographic locations using the user device.

9. The method of claim 1, wherein one or more geographic locations are displayed in an order of their distance from the user device.

10. A user device, comprising:
a display to display to a user, on the user device, an indication of whether one or more other users are experiencing respective media within a customizable search area, where the display further displays automatically to the user at least one indicator corresponding, respectively, to at least one of the one or more other users, wherein the indicator is alterable at least in part after one decides to experience respective media in real time while any of the respective at least one of the one or more other users currently experiences the respective media, wherein
the indicator is displayed concurrently with at least one respective identifier related to the at least one or more other users determined to be within the customizable search area, and
the display further displays an icon configured to allow the user to select whether to experience one or more of the respective media on the user device; and
a processor communicatively coupled to a transmitter to transmit a signal to a second user to indicate to the second user that the user of the user device selected to experience the media being experienced by the second user, wherein
when the user selects to experience one or more of the respective media on the user device, the respective media is experienced such that the respective media is experienced concurrently in real time with the respective media experienced by the second user.

11. The user device of claim 10, wherein the respective media initiated by the second user is previously stored on a server before being initiated.

12. The user device of claim 10, wherein the display further displays one or more advertisements on the user device of the user or the one or more other users.

13. The user device of claim 12, wherein the one or more advertisements are related to one or more geographic locations or at least one establishment within a set distance from the one or more geographic locations.

14. The user device of claim 10, wherein the user device is able to be incorporated as part of a virtual reality viewing device.

15. The user device of claim 10, wherein at least one of an indication of one or more geographic locations or the respective identifiers are provided in order of their distance from the user device.

16. The user device of claim 10, wherein the display further displays one or more icons, when selected by the user, allowing the user to conduct a business transaction at one or more displayed geographic locations using the user device.

17. A server including a non-transitory computer-readable medium storing instructions thereon for, when executed by one or more processors, causing a user device to:
display to a user, on the user device, an indication of whether one or more other users are experiencing respective media within a customizable search area;
display automatically to the user at least one indicator corresponding, respectively, to at least one of the one or more other users, wherein the indicator is alterable at least in part after one decides to experience respective media in real time while any of the respective at least one of the one or more other users currently experiences the respective media, wherein
the indicator is displayed concurrently with at least one respective identifier related to the at least one or more other users determined to be within the customizable search area;
allow the user to select whether to experience one or more of the respective media on the user device; and
cause a processor to transmit a signal to a second user to indicate to the second user that the user of the user device selected to experience the media being experienced by the second user, wherein
when the user selects to experience one or more of the respective media on the user device, the respective media is experienced such that the respective media is experienced concurrently in real time with the respective media experienced by the second user.

18. The server of claim 17, wherein the respective media initiated by the second user is previously stored on at least one server before being initiated.

19. The server of claim 18, further causing one or more advertisements to be displayed on the user device of the user or the one or more other users.

20. The server of claim 19, wherein the one or more advertisements are related to one or more geographic locations or at least one establishment within a set distance from the one or more geographic locations.

\* \* \* \* \*